UNITED STATES PATENT OFFICE.

CALEB A. THOMPSON, OF ADRIAN, MICHIGAN.

IMPROVEMENT IN MAKING PRINTERS' INK.

Specification forming part of Letters Patent No. 12,733, dated April 17, 1855.

*To all whom it may concern:*

Be it known that I, CALEB A. THOMPSON, of Adrian, Lenawee county, and State of Michigan, have invented a new and Improved Mode of Manufacturing Printing-Inks; and I do hereby declare that the following is a full and exact description thereof.

The nature of my improvement consists in the manner and process of preparing linseed-oil, the introduction of gum-copal, and the proportions of litharge and acetate of lead.

Before using the linseed-oil in compounding my inks I subject it to heat in an iron kettle, (after adding a quantity of litharge and acetate of lead, which are powerful driers) of 600° (six hundred degrees) Fahrenheit, continuing it from forty-eight to sixty-five hours, reference being had to the quality of ink I wish to make. My object in submitting the linseed-oil to this long process of heating is to perfectly eradicate its greasy nature, which is a great objection to all other inks containing this oil. After passing through this process it becomes a tenacious and adhesive substance, which, when dried, adheres firmly to any surface to which it may be applied, and cannot be easily removed.

The litharge and acetate of lead are used for driers only. They are added to the oil before heating, so as to perfectly incorporate them with the oil, the proportions of each being 4 (four) pounds of the litharge and 2 (two) pounds acetate of lead to 40 (forty) gallons linseed-oil for ordinary ink. After preparing the oil as stated I add to it gum-copal by dissolving 4 (four) pounds of the gum in 1 (one) gallon of oil as above prepared. It is then thoroughly incorporated with the mixture by stirring the whole together. This gives my inks a smooth and glossy appearance which other inks do not possess.

After this compound has been thus prepared I allow the heat to subside to 200°, (two hundred degrees. I then insert the ingredients as I shall hereinafter describe.

In preparing news-inks I use the following ingredients and proportions: the oil as previously compounded, fifteen pounds; resin, (common,) ten pounds; brown resin soap, two pounds; lamp-black, five and one-half pounds. The resin and soap are dissolved in the compound in the same vessel. I then add the lamp-black. The whole is then well mixed by stirring. It is then ground in a mill suitable for the purpose, after which it is ready for use.

To make black ink for book-work I continue the heating process of the oil compound for 50 (fifty) hours, varying the proportions as follows: litharge, 6 (six) pounds; acetate of lead, 3 (three) pounds; also gum-copal, 4 (four) pounds. The gum is prepared in the same manner as for news-ink, using the same quantity of linseed-oil. I then compound my book-inks as follows: oil compound, fifteen pounds; resin, (common,) twelve pounds; brown resin soap, three pounds; lamp-black, seven pounds. Then prepare it as in case of news-ink.

To make black ink for card-work I use the same proportions of oil, acetate of lead, litharge, and gum-copal as for book-ink, but continue the heat for 55 (fifty-five) hours. I then compound as follows: oil compound, fifteen pounds; yellow resin, fourteen pounds; brown resin soap, four pounds; lamp-black, eight and one-half pounds. This is now prepared in the same manner as the book-ink.

Each kind of ink must be well ground before it is ready for use.

To prepare a body or basis for any colored ink desired, the oil, litharge, and acetate of lead are used in the same proportions as in black card-inks. The heating process, however, is continued for a period of 60 (sixty) hours instead of 55, (fifty-five.) The proportions will then be as follows: oil compound, fifteen pounds; resin, (white,) fourteen pounds; white bar-soap, four pounds. Then compound it in the same manner as in black card-inks and insert any "color" that may be desired.

What I claim as my invention, and desire to secure by Letters Patent, is—

1. My manner and process of preparing the linseed-oil.

2. The introduction of gum-copal for the purposes set forth.

3. The proportions of litharge, acetate of lead, and other ingredients, as set forth.

CALEB A. THOMPSON.

Witnesses:
C. A. MILLS,
M. R. SIMPSON.